US005941680A

United States Patent [19]
Strohmaier

[11] Patent Number: 5,941,680
[45] Date of Patent: Aug. 24, 1999

[54] TRANSVERSE CONVEYING MEANS AND CONTINUOUS FURNACE EQUIPPED THEREWITH

[75] Inventor: Erich Strohmaier, Suberg, Switzerland

[73] Assignee: Lükon Paul Lüscher Werke AG, Tauffelen, Switzerland

[21] Appl. No.: 08/854,994

[22] Filed: May 13, 1997

[30] Foreign Application Priority Data

May 14, 1996 [DE] Germany .......................... 196 19 485

[51] Int. Cl.[6] ............................................. B65G 25/04

[52] U.S. Cl. ........................ 414/753; 198/468.2; 414/156

[58] Field of Search .................................... 414/749, 751, 414/753, 157, 150, 198, 156; 198/468.2

[56] References Cited

U.S. PATENT DOCUMENTS

| | | | |
|---|---|---|---|
| 3,314,554 | 4/1967 | Cuniberti | 198/468.2 X |
| 4,005,782 | 2/1977 | Crockett | 414/753 X |
| 4,034,867 | 7/1977 | Akagawa | 414/753 |
| 4,058,908 | 11/1977 | Weber | 198/468.2 X |
| 4,229,136 | 10/1980 | Panissidi | 414/753 X |
| 4,588,070 | 5/1986 | Smith | 414/753 X |
| 4,637,243 | 1/1987 | Bond | 414/753 X |
| 5,280,983 | 1/1994 | Maydan et al. | 414/753 X |

*Primary Examiner*—David A. Bucci
*Attorney, Agent, or Firm*—Graham & James LLP

[57] ABSTRACT

A transverse conveying apparatus for a continuous furnace comprises a gripper, which is arranged such that it can be displaced along a transporting rail and is mounted such that it can pivot around an axis of rotation parallel to the transporting rail, the conveying apparatus automatically receives the objects which are to be conveyed. In the closed state, i.e., with the gripper in engagement with the objects which are to be conveyed, the gripper is displaced along the transporting rail. Once the destination has been reached, the carrier is released or opened again by the gripper being rotated in the opposite direction.

13 Claims, 4 Drawing Sheets

TRANSVERSE CONVEYING MEANS AND CONTINUOUS FURNACE EQUIPPED THEREWITH

BACKGROUND OF THE INVENTION

1. Field of the Invention

The invention relates to a conveying means for conveying objects, in particular for conveying sheet-like carriers, in a rectilinear direction and to a vertically conveying continuous furnace equipped therewith.

2. Description of Related Art

In the electronics industry, sheet-like carriers with components located thereon are frequently transported in a rectilinear direction by means of conveying belts. However, such conveying belts cannot always be used and they require, in addition, a device for placing the carriers on the conveying belt.

In the electronics industry, continuous furnaces are frequently used for ageing components artificially and/or for baking coatings, etc. On account of their comparatively high space requirement, the conventional continuous furnaces cannot readily be integrated in production lines or assembly lines. The patent application which was filed on the same day as the present application and is entitled Conveying apparatus for simultaneously conveying a plurality of objects, and vertical continuous furnace equipped therewith, gives a description of a vertical continuous furnace, i.e. a continuous furnace with a vertical continuous conveying direction. A conveying belt is not suitable for removing the carriers which have been conveyed vertically from bottom to top in a vertical continuous furnace, since the carriers which have arrived at the top end of the vertical continuous furnace would have to be guided around the end of the conveying belt.

SUMMARY OF THE INVENTION

It is an object of the present invention to specify a conveying means for conveying sheet-like carriers in a rectilinear direction and also to specify a vertically conveying continuous furnace equipped therewith.

By way of a gripper, which is arranged such that it can be displaced along a transporting rail and is mounted such that it can pivot around an axis of rotation parallel to said transporting rail, the conveying means automatically receives the objects which are to be conveyed. In the closed state, i.e. with the gripper in engagement with the objects which are to be conveyed, the gripper is displaced along the transporting rail. Once the destination has been reached, the carrier is released or opened again by the gripper being rotated in the opposite direction.

According to an advantageous configuration of the invention, the grippers are mounted displaceably on the transporting rail by means of rollers. Alternatively, it is also possible to mount the grippers by means of sliding bearings.

According to a further advantageous configuration of the invention, the gripper comprises a gripping tooth which, by virtue of the gripper being rotated around the axis of rotation, can be brought into engagement with the carrier which is to be conveyed. According to an advantageous configuration, the gripping tooth has rollers at its tip. This avoids any rubbing or sliding contact of the gripping tooth with the objects which are to be conveyed, and thus also avoids wear.

According to a further preferred configuration of the invention, the gripping tooth is connected rigidly to a sleeve which encloses the transporting rail and cannot rotate with respect to the conveying rail. Consequently, rotation of the conveying rail results in rotation of the sleeve, by way of which the gripping tooth is brought into engagement with the objects which are to be conveyed. As a result, it is possible for the rotary mechanism for the gripper to be arranged at one end of the rotatably mounted transporting rail. The actual gripper, comprising a sleeve and gripping tooth, thus has a very straightforward and uncomplicated design.

A square conveying-rail cross section easily ensures that rotation of the conveying rail around an axis parallel to the conveying direction also causes the grippers to rotate. Alternatively, it is also possible to use other cross sections, such as triangular cross sections and polygonal cross sections in general.

According to a further advantageous configuration of the invention, provision is made of two mutually parallel conveying rails with two grippers each, the latter gripping in opposite directions to one another. By virtue of the opposite gripping directions, either from the inside out or from the outside in, the carrier which is to be transported is easily fixed between the two grippers. The objects which are to be conveyed preferably have retaining means, e.g. retaining lugs, on which the gripping teeth act or in which said teeth engage.

According to a further advantageous configuration of the invention, the objects which are to be conveyed are sheet-like carriers on which the products which are actually to be transported, e.g. ICs, are arranged. These carriers preferably have openings, through which the gripping teeth engage and lift the carrier slightly. As a result, the carrier can easily be removed from the vertical conveying apparatus.

The vertical continuous furnace comprises a furnace region which has the carriers passing through vertically. The carriers are supplied by a supply means in a bottom region, progress vertically upwards in the furnace, and are removed from the top end of the furnace by a conveying or transverse conveying means according to the invention, with a horizontal transverse conveying movement. The products which pass through the furnace region are thus supplied at the bottom and removed at the top. Alternatively, it is also possible for supply to take place in the top region by means of a transverse conveying means according to the present invention, and for removal of the products to take place in the bottom region by way of a suitable means.

The vertical continuous furnace comprises at least two vertical furnace columns which are arranged one beside the other and through which the carriers pass vertically. The products which pass through the furnace are supplied in the bottom region of the first furnace column, run vertically upwards in the first furnace column, are seized by a transverse conveying means according to the present invention and conveyed, in a horizontal movement direction, to the top and of the second furnace column, progress vertically downwards in the second furnace column, and are removed from the bottom region of the second furnace column by way of a suitable means.

As far as any further details of the design of the vertical continuous furnace are concerned, you are referred to the contents of the abovementioned application.

BRIEF DESCRIPTION OF THE DRAWINGS

Further details, features and advantages of the invention can be gathered from the following description of preferred embodiments with reference to the drawings, in which.

DETAILED DESCRIPTION OF THE INVENTION

Figure 1:
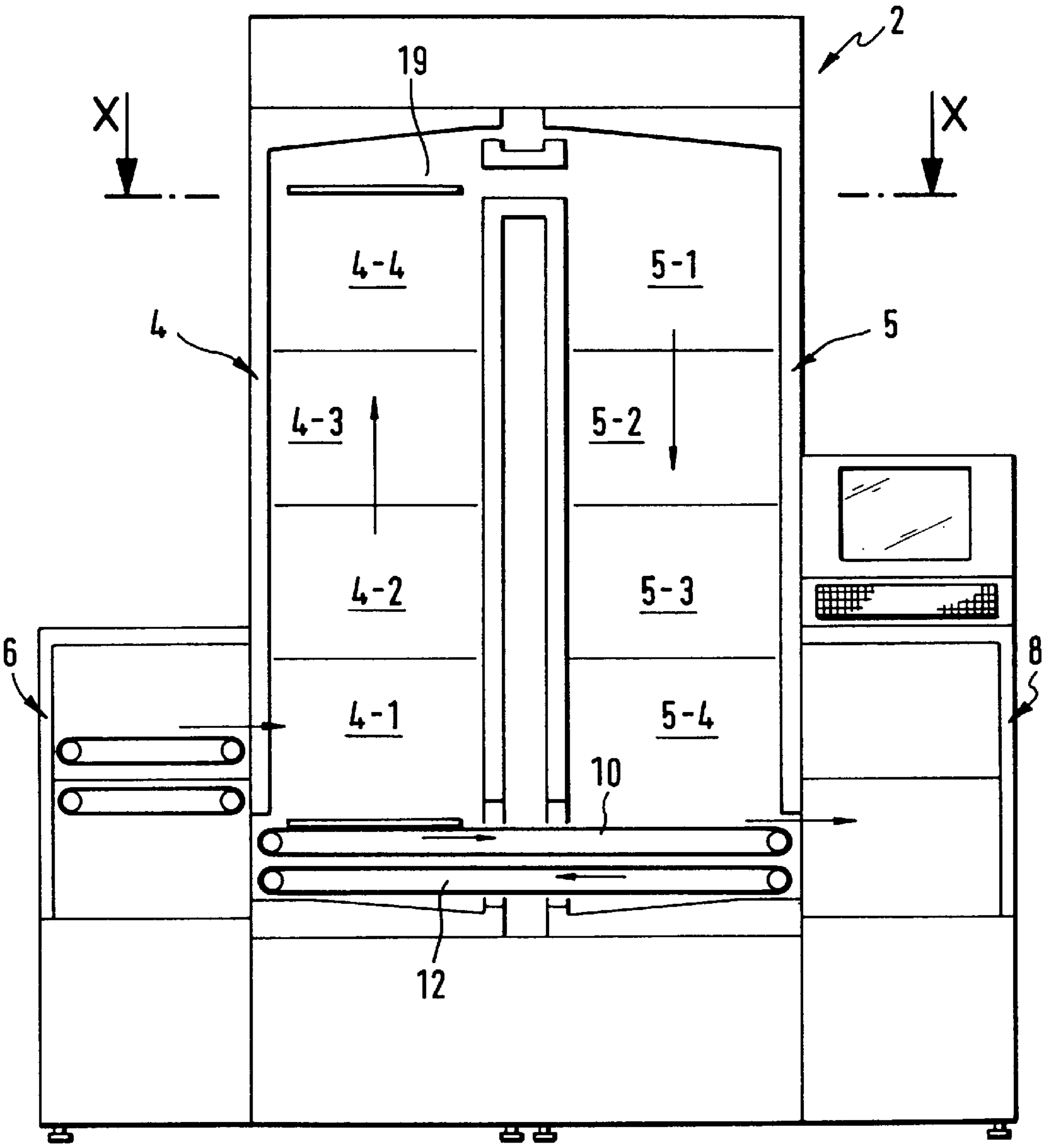
FIG. 1 shows a schematic illustration of a vertical continuous furnace with two vertical furnace columns arranged one beside the other and with a transverse conveying means according to the present invention.

FIG. 1 shows a schematic illustration of a continuous furnace 2 in which the products which pass through the furnace do so in the vertical direction. The continuous furnace 2 comprises a first vertical furnace column 4 and a second vertical furnace column 5, the two being arranged one beside the other and each having four furnace regions 4-1 to 4-4 and 5-1 to 5-4. Arranged on the left-bend side beside the first furnace column 4 is a means 6 for supplying into the first furnace region 4-1 of the first furnace column 4 those products which are to pass through the furnace. Arranged on the right-hand side beside the second furnace column 5 is a means 8 for removing the products from the fourth furnace region 5-4 of the second furnace column 5. The means 6 and 8 also have a top conveying belt 10 and a bottom conveying belt 12, these being arranged one above the other, or one beneath the other, in the bottom region of the furnace columns 4 and 5. Each of the eight furnace regions 4-i, 5-i comprises a laterally arranged heating/cooling means which channels air or process gas into the respective furnace region transversely to the conveying direction.

Figure 2:
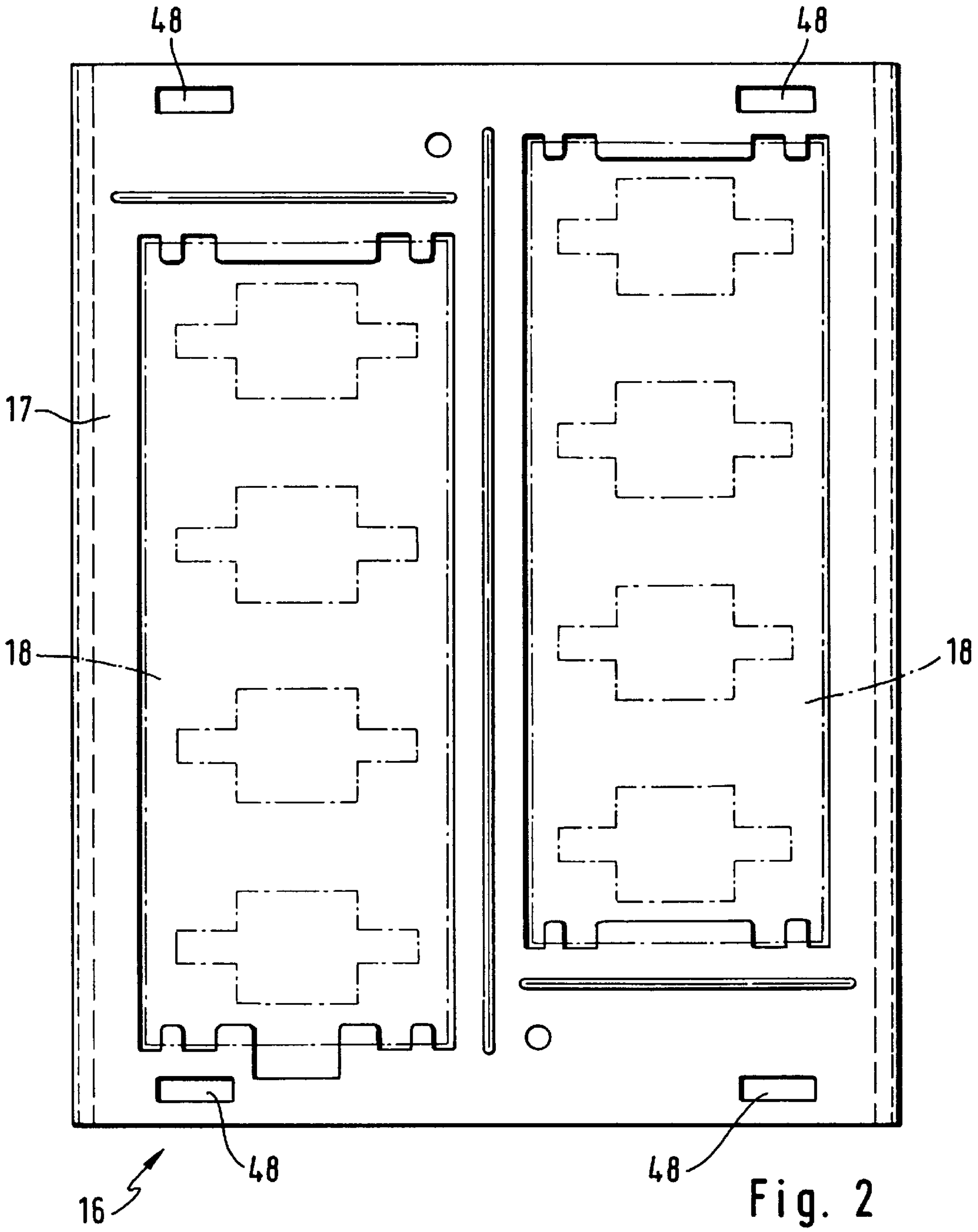
FIG. 2 shows a plan view of a carrier which is conveyed by the conveying means according to the present invention.
Figure 3:
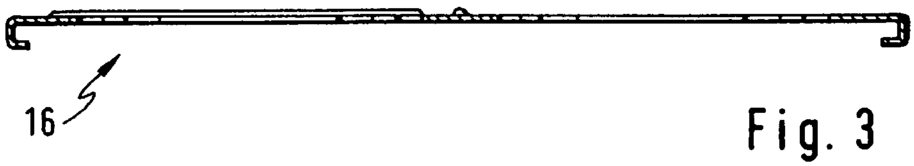
FIG. 3 shows a sectional view of the carrier of FIG. 2.

The products which pass through the furnace are arranged on carriers 16, which are illustrated more specifically in FIGS. 2 and 3. The carriers 16 comprise a carrier frame 17 and two carrier elements 18 arranged thereon. The respective products are arranged on the two carrier elements 18. In the embodiment illustrated in FIGS. 2 and 3, in each case four microprocessors fit onto the two carrier elements 18. The carrier frames 17 circulate in the vertical continuous furnaces 2, i.e. individual carrier elements 18 are supplied via the supply means 6 and arranged in pairs on the individual carrier frames 17. Once in the complete state, the carriers 16 are conveyed, via the top conveying belt 10, into the first furnace region 4-1 of the first furnace column 4. The carriers 16 are conveyed from bottom to top and pass through the furnace regions 4-1 to 4-4 in order. Arranged at the top end of the furnace region 4-4 of the first furnace column 4 is a conveying means for conveying the sheet-like carriers 16 in a rectilinear direction to the second furnace column 5. i.e. a transverse conveying means 19. The transverse conveying means 19 conveys into the uppermost region 5-1 of the second furnace column 5 those carriers 16 which have arrived in the uppermost region of the furnace 4-4. In the second furnace column 5, the carriers 16 pass through the furnace regions 5-1 to 5-4. The carrier elements 18 are separated from the carrier frames 17 by the removal means 8, and the empty carrier frames 17 run back into the supply means 6 via the bottom conveying belt 12.

As far as any further details of the vertical continuous furnace are concerned, you are referred to the contents of the application submitted on the same day.

The details of the design of the transverse conveying means 19 are described herein below with reference to FIGS. 4, 5 and 6. As can be seen from FIG. 4, the transverse conveying means 19 according to the invention comprises a first transporting rail 20 and a second transporting rail 21, the two rails being arranged parallel to one another and extending transversely over the first furnace column 4 and the second furnace column 5. The transporting rails 20 and 21 have a square cross section with four side surfaces 22 and slightly rounded edges. The two transporting rails 20 and 21 are mounted by means of bearings 26 such that they can rotate around an axis 27.

A first gripper 28 and a second gripper 29 in each case are arranged, such that they can be displaced in the longitudinal direction, on the two transporting rails 20 and 21. The two grippers 28 and 29 each respectively comprise a tubular sleeve 30, 31 enclosing the respective transporting rail 20, 21. As shown in FIGS. 5 and 6, at the two ends 32 and 33 of the sleeves 30 and 31, the latter are mounted, by moans of four rollers 36 in each case, on the four side surfaces 22 of the transporting rails 20 and 21 such that they can be displaced in the conveying direction, i.e. parallel to the transporting rails 20 and 21. The square cross section of the transporting rails 20 and 21 means that the sleeves 30 and 31 cannot rotate with respect to the transporting rails 20 and 21, i.e. a rotation of the transporting rails 20 and 21 also causes the sleeves 30 and 31 to rotate.

Figure 6:
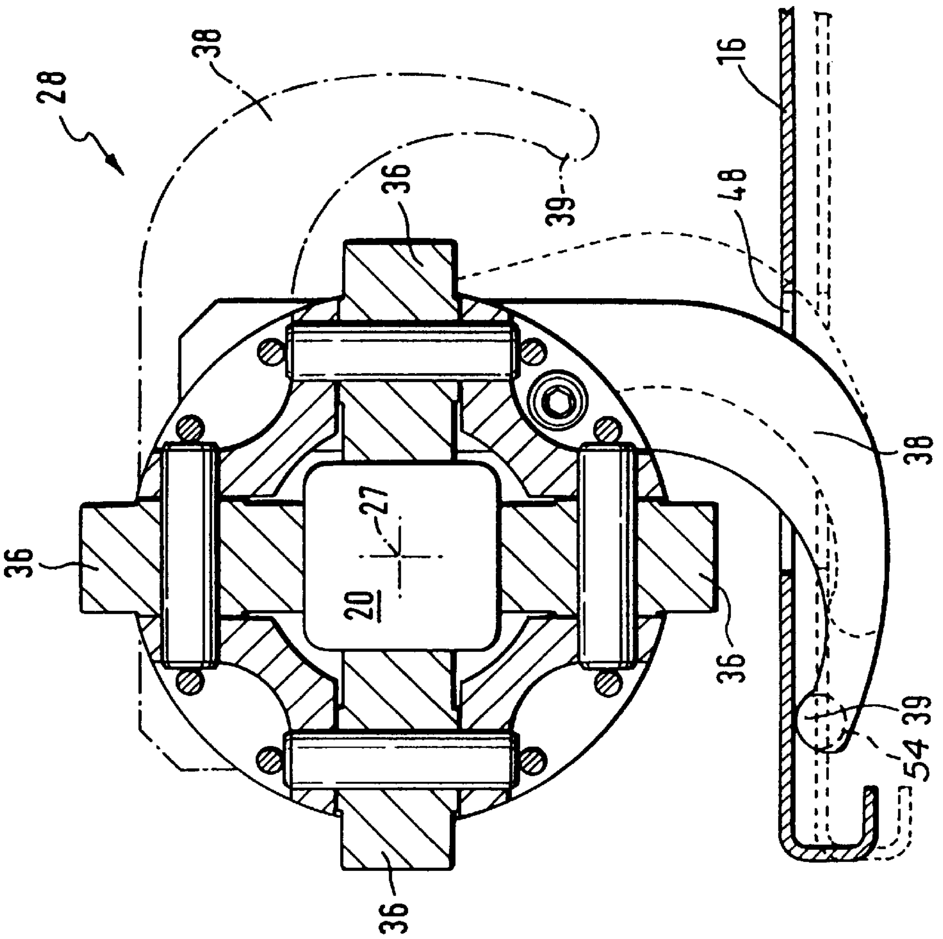
FIG. 6 shows a cross section through the transverse conveying means according to FIGS. 4 and 5, the section being taken along the plane A—A in FIG. 5.
Figure 5:
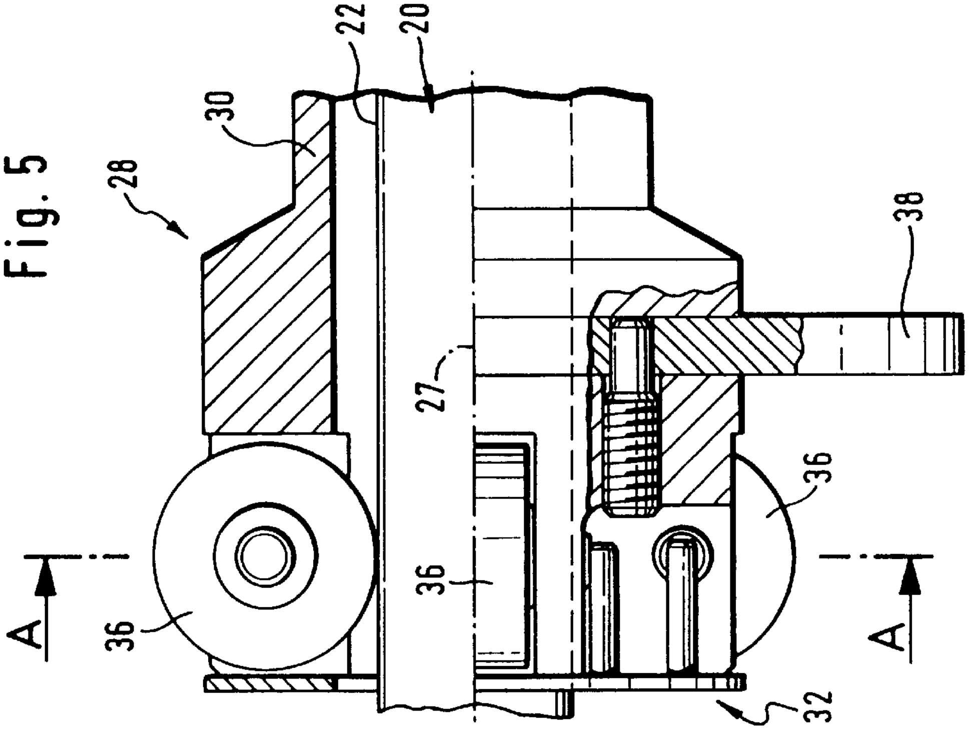
FIG. 5 shows a longitudinal section through the transverse conveying means according to FIG. 4, the section being taken along the plane B—B in FIG. 4.

As shown in FIGS. 5 and 6, at the front end 32 and rear end 33 of the sleeves 30 and 31, just behind the rollers 36, a bent gripping tooth 38 is in each case connected rigidly to the sleeves 30 and 31. The gripping tooth or teeth 38 first of all extends/extend away from the sleeve and are then bent with the result that the tip 39 of the gripping tooth 38 is oriented in the direction of rotation around the axis of rotation 27 through the transporting rail 20, 21. The gripping tooth may have rollers 54 at its tip, as shown in FIG. 6. In a sectional view corresponding to FIG. 6, the tip 39 of the gripping teeth 38 of the first gripper 28 is aligned in the clockwise direction, and the tip 39 of the gripping teeth 38 of the second gripper 29 is aligned in the counterclockwise direction.

Figure 4:
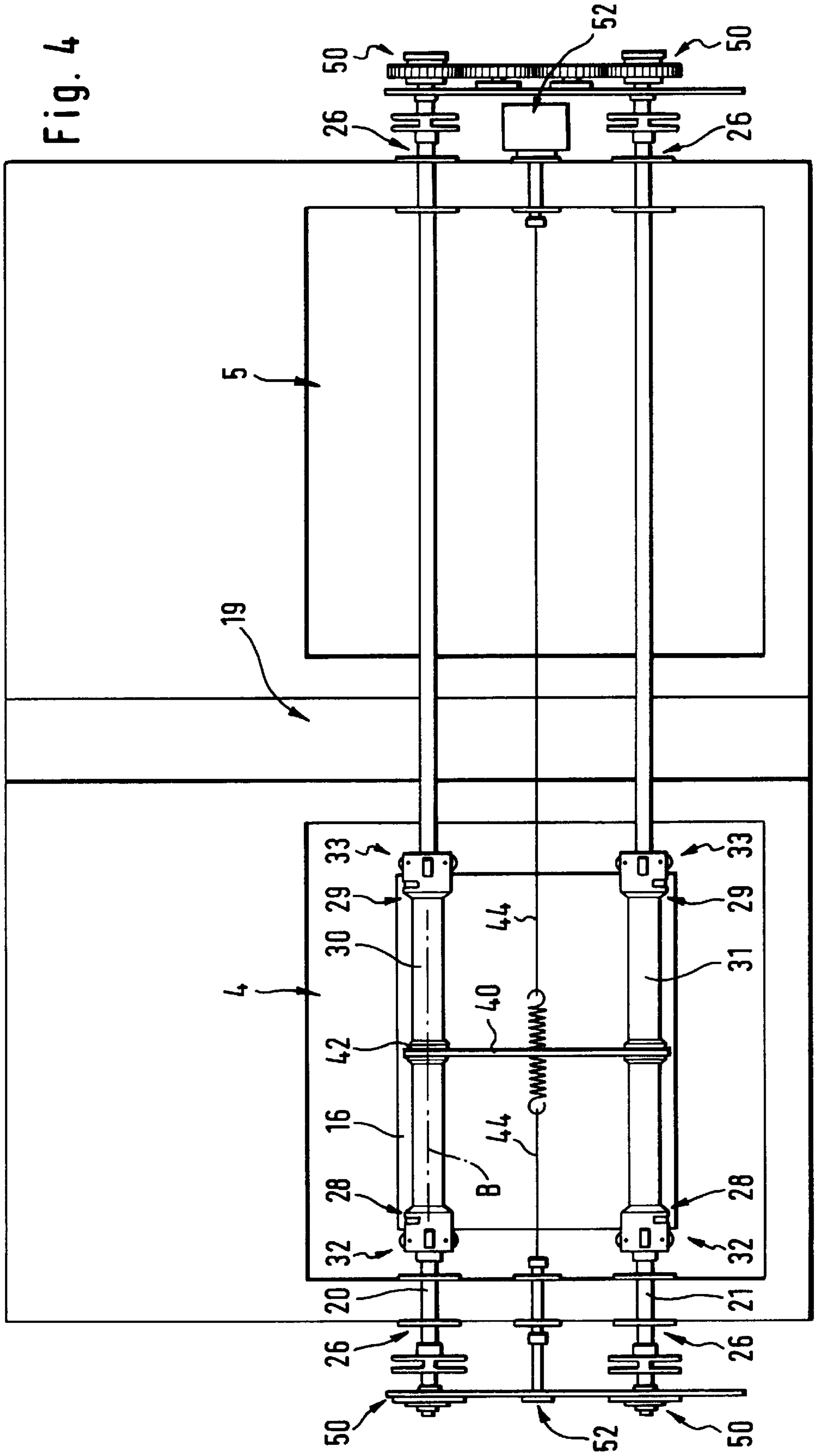
FIG. 4 shows a sectional view along the plans X—X in FIG. 1 with a plan view of a transverse conveying means according to a preferred embodiment of the invention.

As shown in FIG. 4, the two grippers 28 and 29, or their respective sleeves 30 and 31, are connected to one another via a bracket 40. The bracket 40 is fastened on the sleeve 30, 31 by means of a mount 42. The mount 42 is in the form of a groove which runs all the way around the sleeves 30, 31 and in which the bracket 40 engages, with the result that movement of the bracket 40 also causes the sleeve 30 and 31 to move along the transporting rails 20 and 21, respectively. However, the mount 42 of the bracket 40 permits the transporting rail 20, 21, and thus the respective sleeves 30 and 31, to rotate around the axis of rotation 27. A pulling cable 44, by means of which the grippers 28 and 29 can move along the transporting rails 20 and 21, acts on the bracket 40 in both directions.

As can be seen from FIG. 2, the carriers 16, or more specifically the carrier frames 17, comprise four slot-type openings 48 arranged in the region of the corners. The gripping teeth 38 of the grippers 28 and 29 engage in the slot-type openings 48 and thus receive the carrier 16. FIG. 6 shows the closed state of the gripper 28, i.e. the gripping teeth 38 engage through the slot-type openings 48 and lift the carrier 16 slightly. The open state of the gripper 28 is illustrated by dashed lines in FIG. 6.

The transverse conveying means 19 comprises a rotating or tilting device 50 for rotating the transporting rails 20 and 21, and thus for opening and closing the grippers 28 and 29, and also comprises a pulling device 52 for winding up and unwinding the pulling cable 44. In the open state, the grippers 28 and 29 are positioned, by means of the pulling device 52, over the carrier 16 which is to be transported or conveyed. There, the rotating device 50 rotates the transporting rail 20 in the clockwise direction and the transporting rail 21 in the counterclockwise direction, with the result that the gripping teeth 38 of the grippers 28 and 29 engage through the slots 48 and lift the carrier 16 slightly. The two grippers 28 and 29 are then pulled, by means of the pulling cable 44, along the transporting rails 20 and 21 so as to be positioned over the second furnace column 5. There, the grippers 28 and 29 are opened by means of the rotating device 50, and the vertical conveying apparatus of the second furnace column 5 receives the carrier.

List of designations

2 Vertical continuous furnace
4 First furnace column
5 Second furnace column
4-i Furnace regions of the furnace column 4, i=1 to 4
5-i Furnace regions of the furnace column 5, i=1 to 4
6 Supply means
8 Removal means
10 Top conveying belt
12 Bottom conveying belt
16 Carrier
17 Carrier frame
18 Carrier element
19 Transverse conveying moans
20 First transporting rail
21 Second transporting rail
22 Side surfaces of 20, 21
26 Bearing of 20, 21
27 Axis of rotation of 20, 21
28 First gripper
29 Second gripper
30 First sleeve
31 Second sleeve
32 End of 22, 23
33 End of 22, 23
36 Rollers
38 Gripping tooth
39 Tip
40 Bracket
42 Mount of 40,
44 Pulling cable
48 Slot-type openings
50 Rotating device of 20, 21
52 Pulling device

I claim:

1. A conveying apparatus for conveying objects in a rectilinear direction, comprising:

at least one conveying rail arranged in the conveying direction, at least one gripper comprising a gripping tooth, wherein the at least one gripper is arranged such that it can be displaced along the conveying rail and which retains the object which is to be conveyed, and wherein the at least one gripper is adapted to be brought into releasable engagement with the object which is to be conveyed, the at least one gripper being mounted such that it can pivot about an axis of rotation which runs parallel to the conveying rail between an open state and a closed state, wherein the gripping tooth is pivoted to a position entirely above the object to be conveyed when in the open state, and the gripping tooth is pivoted to a position at least partially below a portion of the object to be conveyed when in the closed state.

2. The apparatus as claimed in claim 1, wherein the gripper can be displaced along the conveying rail by use of rollers.

3. The apparatus as claimed in claim 1, wherein the gripping tooth further comprises a tip that extends essentially in the direction of the pivot movement of the gripper.

4. The apparatus as claimed in claim 3, wherein the tip of the gripping tooth further comprises a roller.

5. The apparatus as claimed in claim 1, wherein the gripper has a sleeve which encloses the conveying rail.

6. The apparatus as claimed in claim 1, wherein the conveying rail has a square profile.

7. The apparatus as claimed in claim 1, wherein two conveying rails with grippers are arranged parallel to one another, permitting the grippers thereof to pivot in opposite directions with respect to one another.

8. The apparatus as claimed in claim 7, wherein the two conveying rails are arranged over the objects which are to be conveyed, and wherein the grippers pivot outwardly and can be brought into engagement with the objects which are to be conveyed.

9. The apparatus as claimed in claim 8, wherein the objects which are to be conveyed have retaining means with which the gripping tooth of each one of the grippers can be brought into engagement.

10. The apparatus as claimed in claim 1, wherein the objects which are to be conveyed are flat carriers.

11. A conveying apparatus for conveying objects in a rectilinear direction, comprising:

at least one conveying rail arranged in the conveying direction, at least one gripper comprising a gripping tooth connected fixedly to a sleeve, which encloses the conveying rail, wherein the sleeve cannot rotate with respect to the conveying rail, and wherein the conveying rail is mounted rotatably, wherein the at least one gripper is arranged such that it can be displaced along the conveying rail and which retains the object which is to be conveyed, and wherein the at least one gripper can be brought into releasable engagement with the object which is to be conveyed, and the at least one gripper is mounted such that it can pivot about an axis of rotation which runs parallel to the conveying rail.

12. A conveying apparatus for conveying flat carriers in a rectilinear direction, comprising:

at least one conveying rail arranged in the conveying direction, at least one gripper which is arranged such that it can be displaced along the conveying rail and which retains the carrier which is to be conveyed, and wherein the at least one gripper can be brought into engagement with the flat carriers through an opening in said carriers, and the at least one gripper is mounted such that it can pivot about an axis of rotation which runs parallel to the conveying rail.

13. A gripping apparatus in a furnace having at least one gripper with at least one gripping tooth that is opened and closed by a rotating device, wherein the at least one gripper is positioned in the open state over an object with openings that is to be transported from a first column of the furnace by the at least one gripping tooth engaging through said openings and lifting the object slightly, whereby the at least one gripper is then positioned over a second column of the furnace which receives the object.

* * * * *